(12) United States Patent
Chang

(10) Patent No.: US 9,516,388 B2
(45) Date of Patent: Dec. 6, 2016

(54) APPARATUS AND METHOD FOR GENERATING ELECTRONIC PROGRAM GUIDE

(71) Applicant: Wistron Corporation, New Taipei (TW)

(72) Inventor: Wen-Yung Chang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/332,419

(22) Filed: Jul. 16, 2014

(65) Prior Publication Data

US 2015/0150054 A1 May 28, 2015

(30) Foreign Application Priority Data

Nov. 27, 2013 (TW) .............................. 102143186 A

(51) Int. Cl.
G06F 3/00 (2006.01)
H04N 21/482 (2011.01)
G06F 17/30 (2006.01)

(52) U.S. Cl.
CPC ...... H04N 21/4828 (2013.01); G06F 17/3084 (2013.01); H04N 21/4826 (2013.01)

(58) Field of Classification Search
CPC .................... H04N 21/4828; H04N 21/4826; H04N 21/85
See application file for complete search history.

(56) References Cited

U.S. PATENT DOCUMENTS

| 6,157,905 | A | 12/2000 | Powell | |
|---|---|---|---|---|
| 2009/0199241 | A1* | 8/2009 | Unger | H04N 5/44543 725/41 |
| 2009/0300011 | A1* | 12/2009 | Takata et al. | 707/5 |
| 2010/0281036 | A1* | 11/2010 | Inoue et al. | 707/749 |

OTHER PUBLICATIONS

Bron, et al., Algorithm 457: Finding all Cliques of an Undirected Graph. Communications of the ACM, 16(9):575-577, 1973.*

* cited by examiner

*Primary Examiner* — Nathan Flynn
*Assistant Examiner* — Alfonso Castro
(74) *Attorney, Agent, or Firm* — McClure, Qualey & Rodack, LLP

(57) ABSTRACT

An apparatus and a method for generating electronic program guide (EPG) are provided. The EPG generating apparatus comprises a receiving interface and a processor. The receiving interface receives an inputting keyword group. The processor generates a program name keyword group according to the program name corresponding to a program description. The processor constructs a semantic similarity degree matrix according to the inputting keyword group and the program name keyword group, and constructs an undirected graph according to the semantic similarity degree matrix. The processor finds a maximum clique set of the undirected graph, and generates a match score according to the program description and the maximum clique set. The processor determines a recommendation sequence of the program name in the EPG according to the match score.

20 Claims, 4 Drawing Sheets

APPARATUS AND METHOD FOR GENERATING ELECTRONIC PROGRAM GUIDE

This application claims the benefit of Taiwan application Serial No. 102143186, filed Nov. 27, 2013, the subject matter of which is incorporated herein by reference.

BACKGROUND OF THE INVENTION

Field of the Invention

The invention relates in general to an electronic apparatus, and more particularly to an apparatus and a method for generating electronic program guide (EPG).

Description of the Related Art

Along with the advance in technology, nowadays TV is used in almost every family. The hardware of TV evolves from CRT TV, which is large and heavy, to liquid crystal TV, which is slim and light, and the signal transmission of TV evolves from analog to digital. People used to look up TV program list on newspapers. Nowadays, people can easily check the electronic program guide (EPG) provided by the software of the multimedia center of a set top box (STB).

The EPG is implemented by embedding service information (SI) defined according to the digital video broadcasting (DVB) standards into a transport stream (TS) conforming to the MPEG-2 (13818-1) specification. The decoder of the set top box (STB) can retrieve information such as the play list and time table of the programs broadcasted by program providers from the transport stream, and further display the play list and time table through a user interface, such that the user can conveniently select and watch a TV program. The EPG information mainly comprises basic EPG information and extended EPG information. The basic EPG information refer to the EPG information which can be completely described by using network information table (NIT), bouquet association table (BAT), service description table (SDT) and event information table (EIT) of the specifications of conditional access system for digital television (GY/Z174-2001). In addition to the basic EPG information, the extended EPG information refer to the EPG information which are transmitted through data carousel transmission. These information are described by using EPG mapping table (EMT). The contents of information are packaged into a file system with multi-level directory structure, and are referred as the extended EPG content information. During the broadcasting of digital TV programs, auxiliary messages of service information can be added for the developer of set top box to implement navigation function for the EPG. Through the use of the EPG, the user can watch TV programs and look up interesting information. For instance, the user can search programs according to program categories (such as music, sports, movies, and so on) or program providers, and can also check the broadcasting list of upcoming programs and program broadcasting in a video network.

However, as the TV channels are gaining booming development, the EPG information are getting versatile and complicated. When using the set top box, it is a considerable waste of time to browse the program list of each channel to find an interesting program every day. Therefore, how to help the user to quickly find an interesting program from the EPG has become a prominent problem to be resolved.

SUMMARY OF THE INVENTION

The invention is directed to an apparatus and a method for generating electronic program guide (EPG).

According to one embodiment of the present invention, an EPG generating method is provided. The EPG generating method comprises following steps: receiving an inputting keyword group; generating a program name keyword group according to the program name corresponding to a program description; constructing a semantic similarity degree matrix according to the inputting keyword group and the program name keyword group; constructing an undirected graph according to the semantic similarity degree matrix; finding a maximum clique set of the undirected graph; generating a match score according to the program description and the maximum clique set; determining a recommendation sequence of the program name in the EPG according to the match score.

According to another embodiment of the present invention, an electronic program guide (EPG) generating apparatus is provided. The EPG generating apparatus comprises a receiving interface and a processor. The receiving interface receives an inputting keyword group. The processor generates a program name keyword group according to the program name corresponding to a program description. The processor constructs a semantic similarity degree matrix according to the inputting keyword group and the program name keyword group, and constructs an undirected graph according to the semantic similarity degree matrix. The processor finds a maximum clique set of the undirected graph, and generates a match score according to the program description and the maximum clique set. The processor determines a recommendation sequence of the program name in the EPG according to the match score.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
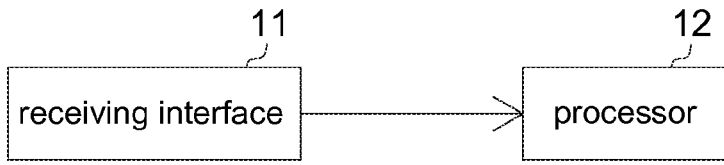
FIG. 1 is a detailed flowchart of step 201 according to a first embodiment.

Referring to FIG. 1, a detailed flowchart of step 201 according to a first embodiment is shown. The electronic program guide (EPG) generating apparatus 1 comprises a receiving interface 11 and the processor 12. The receiving interface 11 receives an inputting keyword group ($X_1$, $X_2$, ..., $X_{n-1}$, $X_n$) which the user searches for, wherein n is a positive integer greater than or equal to 1. The processor 12 generates a program name keyword group ($A_1$, $A_2$, ..., $A_{r-1}$, $A_r$) according to a program name Y corresponding to a program description Z, wherein r is a positive integer greater than or equal to 1. The processor 12 compares the program names of an event information table (EIT) conforming to the specifications of conditional access system for digital television (GY/Z714-2001) with content descriptions, and collects statistics. Suppose the EPG obtained from the current transport stream (TS) has m programs, there will be m groups of program names and program descriptions $\{(Y_1,Z_1), (Y_2,Z_2), \ldots, (Y_{m-1},Z_{m-1}), (Y_m,Z_m)\}$. Each program name Y corresponds to a program description Z, and m is a positive integer greater than or equal to 1.

The processor 12 constructs a semantic similarity degree matrix according to the inputting keyword group $(X_1, X_2, \ldots, X_{n-1}, X_n)$ and the program name keyword group $(A_1, A_2, \ldots, A_{r-1}, A_r)$, and constructs an undirected graph according to the semantic similarity degree matrix. The processor 12 such as constructs the semantic similarity degree matrix according to the 'Word Similarity Computing Based on How-Net' disclosed by Qun Liu and Sujian Li. The How-Net comprises 816 verb concepts, 143 noun concepts, 119 attributes, 12 adverb concepts, 3 parallel concepts, 7 conjunction concepts, 16 auxiliary concepts, 3 unit word concepts, 88 field concepts, 110 groups of verb commutation relations, 110 groups of state commutation relations and a dictionary comprising 62363 definition of terms. The processor 12 finds a maximum clique set of the undirected graph, and generates a match score according to the program description and the maximum clique set. The processor 12 determines a recommendation sequence of the program name in the EPG according to the match score.

Figure 2:
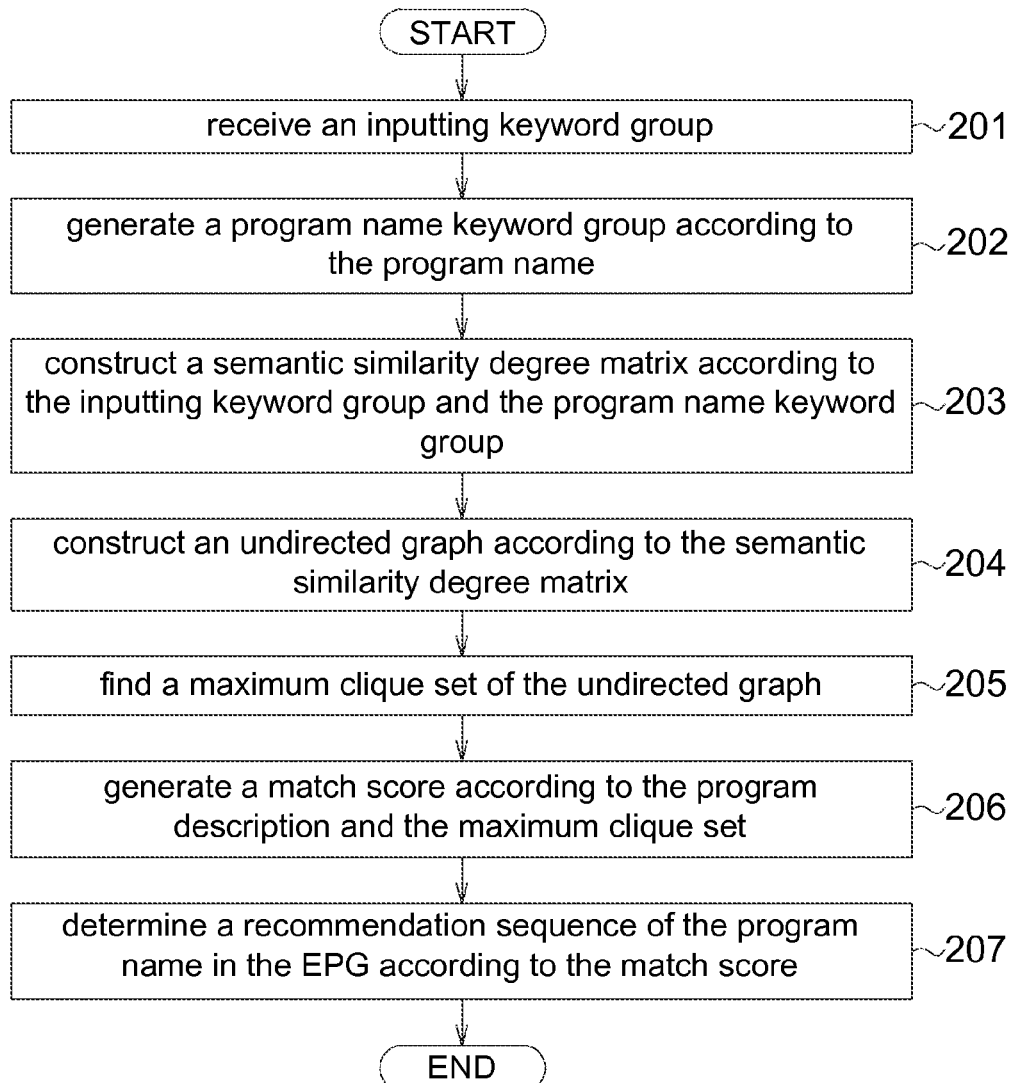
FIG. 2 is a flowchart of a method for generating electronic program guide according to a first embodiment.
Figure 3:
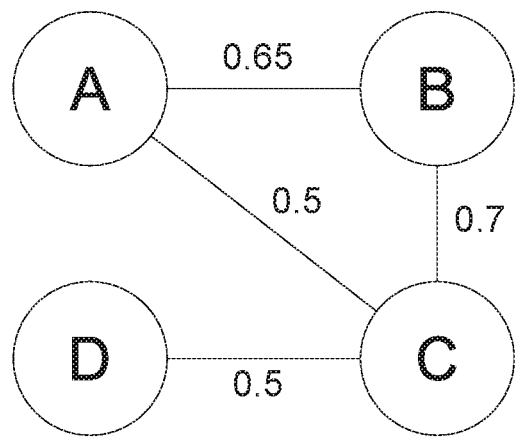
FIG. 3 is an undirected graph.
Figure 4:
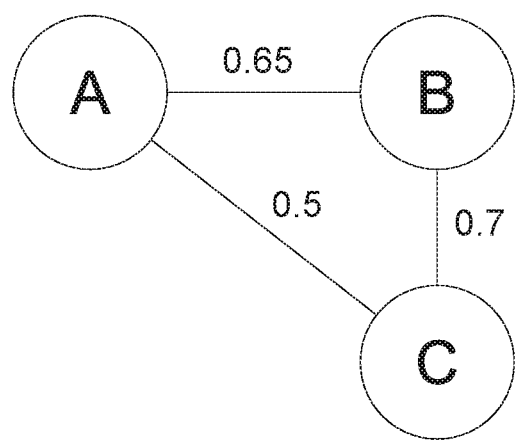
FIG. 4 is a maximum clique of FIG. 3.

Referring to Table 1, Table 2, Table 3, FIG. 1, FIG. 2, FIG. 3 and FIG. 4. Table 1 is an example of the inputting keyword group. Table 2 is an example of the program name keyword group. Table 3 is an example of the semantic similarity degree matrix. FIG. 2 is a flowchart of a method for generating electronic program guide according to a first embodiment. FIG. 3 is an undirected graph. FIG. 4 is a maximum clique of FIG. 3. The EPG generating method comprises following steps: Firstly, the method begins at step 201, the receiving interface 11 receives an inputting keyword group $(X_1, X_2, \ldots, X_{n-1}, X_n)$ that the user searches for, wherein n is a positive integer greater than or equal to 1. For instance, the keyword group $(X_1, X_2, \ldots, X_{n-1}, X_n)$ comprises keywords 'Professional Baseball' and 'Sports' as listed in Table 1, wherein 'Professional Baseball' and 'Sports' correspond to node B and node D respectively.

TABLE 1

| Input keyword | Node |
| --- | --- |
| Professional Baseball | B |
| Sports | D |

Then, the method proceeds to step 202, the processor 12 generates a program name keyword group according to a program name $(A_1, A_2, \ldots, A_{r-1}, A_r)$, wherein r is a positive integer greater than or equal to 1. The processor 12 retrieves the program name keyword group $(A_1, A_2, \ldots, A_{r-1}, A_r)$ capable of representing the program name Y by using the Chinese Word Segmentation System provided by the Chinese Knowledge and Information Processing (CKIP) Group of the Academia Sinica, Taiwan (http://ckipsvr.iis.sinica.edu.tw/). For instance, the program name keyword group $(A_1, A_2, \ldots, A_{r-1}, A_r)$ comprises keywords 'Chinese', 'Professional Baseball' and 'Weekly' as listed in Table 2, wherein 'Chinese', 'Professional Baseball' and 'Weekly' correspond to node A, node B and node C respectively.

TABLE 2

| Program Name Keyword | Node |
| --- | --- |
| Chinese | A |
| Professional Baseball | B |
| Weekly | C |

Then, the method proceeds to step 203, the processor 12 constructs a semantic similarity degree matrix according to the inputting keyword group $(X_1, X_2, \ldots, X_{n-1}, X_n)$ and the program name keyword group $(A_1, A_2, \ldots, A_{r-1}, A_r)$. For instance, the semantic similarity degree matrix comprises nodes A, B, C and D as listed in Table 3, wherein the node A, the node B, the node C and the node D respectively represent 'Chinese', 'Professional Baseball', 'Weekly' and 'Sports'. The semantic similarity degrees between the node A, the node B, the node C and the node D are listed in Table 3. For instance, the semantic similarity degree between the node A and the node B is 0.65; the semantic similarity degree between the node A and the node C is 0.5; the semantic similarity degree between the node A and the node D is 0.4.

TABLE 3

| Node | A | B | C | D |
| --- | --- | --- | --- | --- |
| A | 1 | 0.65 | 0.5 | 0.4 |
| B | 0.65 | 1 | 0.7 | 0.2 |
| C | 0.5 | 0.7 | 1 | 0.5 |
| D | 0.4 | 0.2 | 0.5 | 1 |

Then, the method proceeds to step 204, the processor 12 constructs an undirected graph according to the semantic similarity degree matrix G. For convenience of elaboration, the undirected graph G of the first embodiment is exemplified by FIG. 3. The undirected graph G=(V,E), wherein V is a node set of the undirected graph G, and E is an edge set of the undirected graph G. The processor 12 constructs a node set V according to the inputting keyword group $(X_1, X_2, \ldots, X_{n-1}, X_n)$ and the program name keyword group $(A_1, A_2, \ldots, A_{r-1}, A_r)$. The number of nodes of the node set V is equal to the keyword count n of the inputting keyword group $(X_1, X_2, \ldots, X_{n-1}, X_n)$ plus the keyword count r of the program name keyword group $(A_1, A_2, \ldots, A_{r-1}, A_r)$ minus the number of repetitive keywords s. The processor 12 constructs the edge set E according to the node set V and the semantic similarity degree matrix. If the semantic similarity degree between any two nodes of the node set V greater than or equal to a similarity threshold α, then an edge between two nodes is constructed. The weight of an edge is the semantic similarity degree corresponding to the edge. That is, the semantic similarity degree corresponding to each edge of the edge set E must be greater than or equal to the similarity threshold α. The processor 12 constructs the undirected graph G according to the node set V and edge set E. For instance, if the similarity threshold α is equal to 0.5, then the undirected graph G is as illustrated in FIG. 3.

The undirected graph G comprises the semantic similarity degree between nodes A, B, C and D and nodes A, B, C and D. If the semantic similarity degree between the node A and the node B being 0.65 is greater than similarity threshold α, then an edge is constructed between the node A and the node B. If the semantic similarity degree between the node B and the node C being 0.7 is greater than similarity threshold α, then an edge is constructed between the node B and the node C. If the semantic similarity degree between the node C and the node D being 0.5 is equal to similarity threshold α, then an edge is constructed between the node C and the node D. If the semantic similarity degree between the node A and the node C being 0.5 is equal to similarity threshold α, then an edge is constructed between the node A and the node C.

Then, the method proceeds to step 205, the processor 12 finds a maximum clique set of the undirected graph G. For convenience of elaboration, the maximum clique set of the first embodiment comprises a maximum clique G' corresponding to the optimum keyword group (X1', X2', ..., Xp-1', Xp'), wherein p is a positive integer greater than 1. In some embodiments, the maximum clique set may comprise several maximum cliques. The maximum clique G' must be greater than the node threshold β. For instance, if the node threshold β is equal to 3, then the maximum clique G' is as illustrated in FIG. 4.

Then, the method proceeds to step 206, the processor 12 generates a match score according to the program description Z and the maximum clique set. Furthermore, the processor 12 compares the optimum keyword group ($X_1'$, $X_2'$, ..., $X_{p-1}'$, $X_p'$) with a program description Z to generate an occurrence frequency of a keyword of the optimum keyword group ($X_1'$, $X_2'$, ..., $X_{p-1}'$, $X_p$) in the program description Z, and divides the occurrence frequency by the keyword count p of the optimum keyword group ($X_1'$, $X_2'$, ..., $X_{p-1}'$, $X_p'$) to generate a match score. Then, the method proceeds to step 207, the processor 12 determines a recommendation sequence of the program name Y in the EPG according to the match score.

Figure 5:
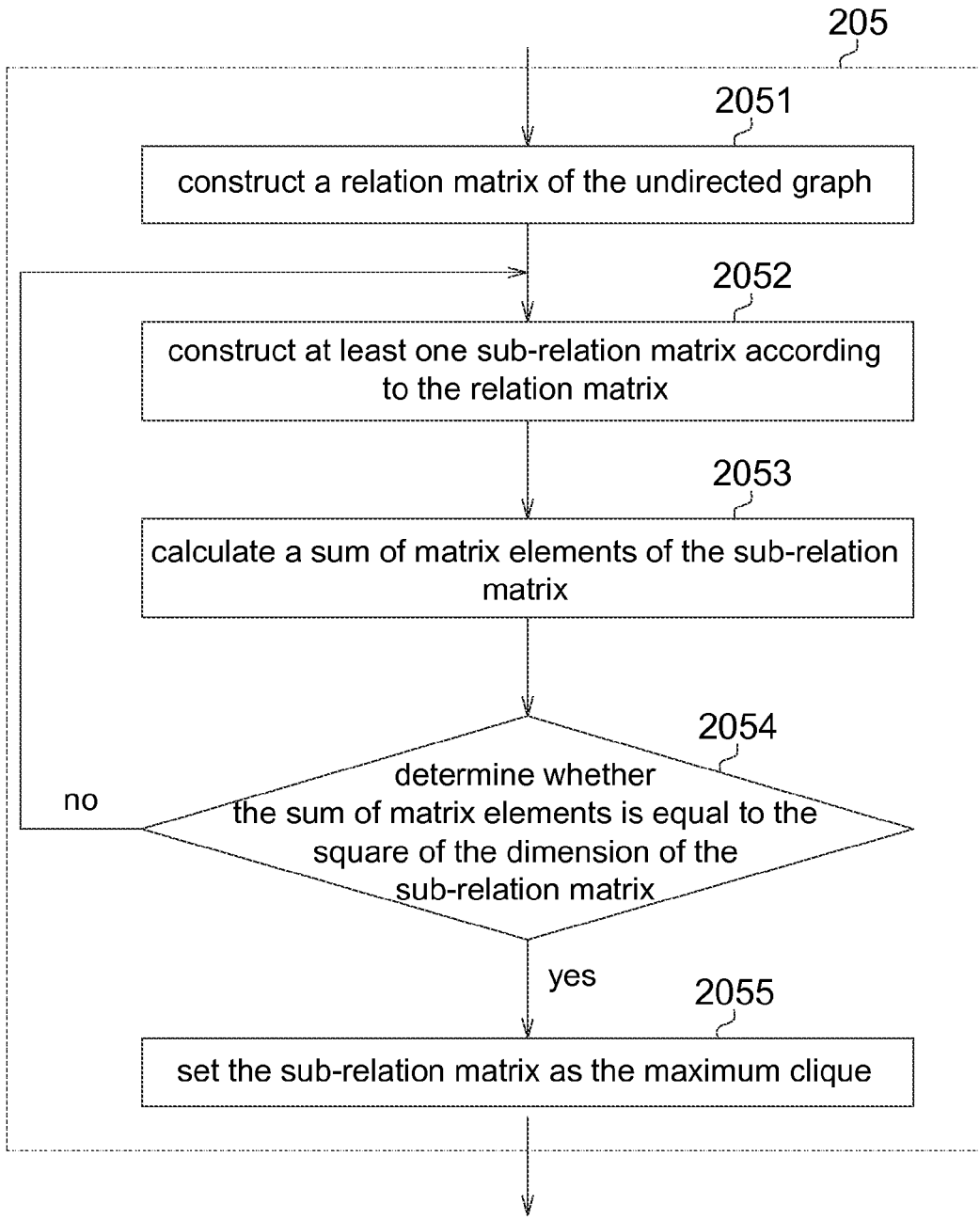
FIG. 5 is a detailed flowchart of step 205 according to a first embodiment

Referring to Table 4, Tables 5A~5D, FIG. 1, FIG. 2 and FIG. 5. Table 4 is an example of the relation matrix. Tables 5A~5D are sub-relation matrixes whose dimensions are greater than the dimension threshold. FIG. 5 is a detailed flowchart of step 205 according to a first embodiment. Furthermore, step 205 further comprises step 2051~2055. In step 2051, the processor 12 constructs a relation matrix of the undirected graph G. The relation matrix is illustrated in Table 4, wherein the dimension of the relation matrix w is equal to 4. Then, the method proceeds to step 2052, the processor 12 constructs a sub-relation matrixes according to the relation matrix. The sub-relation matrix is illustrated in Table 5A~5D, and the dimension of the sub-relation matrix w' is less than or equal to the dimension of the relation matrix w. The dimension of the sub-relation matrix w' as illustrated in Table 5A~5D is equal to 3.

Then, the method proceeds to step 2053, the processor 12 calculates a sum of matrix elements of the sub-relation matrix, wherein the sum of matrix elements of Table 5A is equal to 9, the sum of matrix elements of Table 5B is equal to 5, the sum of matrix elements of Table 5C is equal to 7, and the sum of matrix elements of Table 5D is equal to 7. Then, the method proceeds to step 2054, the processor 12 determines whether the sum of matrix elements is equal to the square of the dimension w' of the sub-relation matrix. Then, the method proceeds to step 2055, the sub-relation matrix is set as the maximum clique if the sum of matrix elements is equal to the square of the dimension w' of the sub-relation matrix. In short, the sub-relation matrix illustrated in Table 5A is the maximum clique.

TABLE 4

| Node | A | B | C | D |
|---|---|---|---|---|
| A | 1 | 1 | 1 | 0 |
| B | 1 | 1 | 1 | 0 |
| C | 1 | 1 | 1 | 1 |
| D | 0 | 0 | 1 | 1 |

TABLE 5A

| Node | A | B | C |
|---|---|---|---|
| A | 1 | 1 | 1 |
| B | 1 | 1 | 1 |
| C | 1 | 1 | 1 |

TABLE 5B

| Node | A | B | D |
|---|---|---|---|
| A | 1 | 1 | 0 |
| B | 1 | 1 | 0 |
| D | 0 | 0 | 1 |

TABLE 5C

| the node | A | C | D |
|---|---|---|---|
| A | 1 | 1 | 0 |
| C | 1 | 1 | 1 |
| D | 0 | 1 | 1 |

TABLE 5D

| Node | B | C | D |
|---|---|---|---|
| B | 1 | 1 | 0 |
| C | 1 | 1 | 1 |
| D | 0 | 1 | 1 |

Second Embodiment

Figure 6:
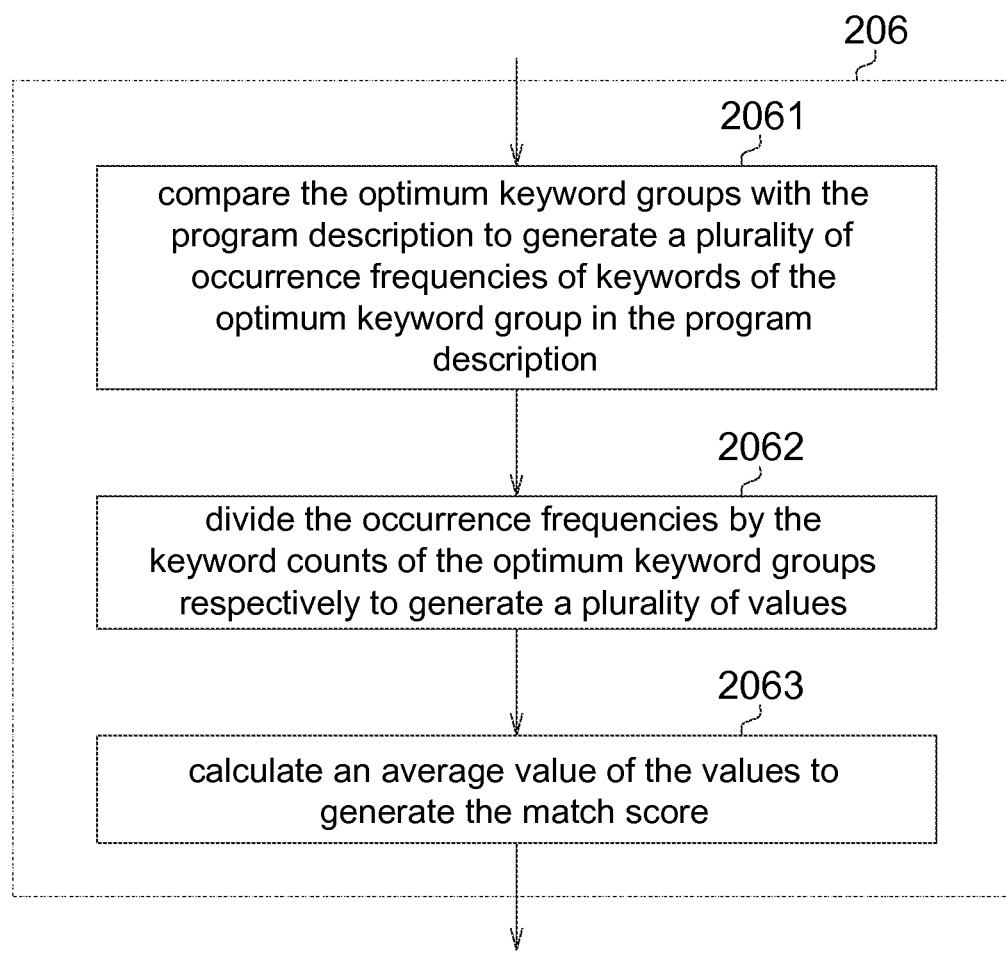
FIG. 6 is a detailed flowchart of step 206 according to a second embodiment.

Referring to Table 4, Table 5A~5D, FIG. 1, FIG. 2 and FIG. 6, FIG. 6 is a detailed flowchart of step 206 according to a second embodiment. The second embodiment is different from the first embodiment mainly in the detailed flowchart of step 206, and in that the maximum clique set of the second embodiment comprises t maximum cliques, wherein t is a positive integer greater than 1. In the second embodiment, step 206 further comprises steps 2061~2064. In step 2061, the processor 12 compares t optimum keyword groups ($X_1'$, $X_2'$, ..., $X_{p-1}'$, $X_p'$) with t program descriptions Z to generate t occurrence frequencies of keywords of the optimum keyword group ($X_1'$, $X_2'$, ..., $X_{p-1}'$, $X_p'$) in the program description Z. Then, the method proceeds to step 2062, the processor 12 divides the t occurrence frequencies by the keyword count p of optimum keyword group ($X_1'$, $X_2'$, ..., $X_{p-1}'$, $X_p'$) to generate values $\{B_1, B_2, ..., B_{t-1}, B_t\}$. Then, the method proceeds to step 2603, the processor 12 calculates an average value of the values $\{B_1, B_2, ..., B_{t-1}, B_t\}$ to generate the match score.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic program guide (EPG) generating method applied in an EPG generating apparatus electrically coupled to an image display device, comprising:
    obtaining the EPG by a communication device;
    receiving an inputting keyword group by a receiving interface;
    retrieving a program name keyword group from the EPG according to the program name corresponding to a program description by a processor;
    constructing a semantic similarity degree matrix according to the inputting keyword group and the program name keyword group by the processor;
    constructing an undirected graph according to the semantic similarity degree matrix by the processor;
    finding a maximum clique set of the undirected graph by the processor;
    generating a match score according to the program description and the maximum clique set by the processor; and
    determining a recommendation sequence of the program name in the EPG according to the match score by the processor, transmitting the EPG from the EPG generating apparatus to the image display device and displaying the EPG on the image display device.

2. The EPG generating method according to claim 1, wherein the step of constructing the undirected graph comprises:
    constructing a node set according to the inputting keyword group and the program name keyword group by the processor;
    constructing an edge set according to the node set and the semantic similarity degree matrix by the processor; and
    constructing the undirected graph according to the node set and the edge set by the processor.

3. The EPG generating method according to claim 2, wherein the maximum clique set comprises a maximum clique whose node must be greater than or equal to a node threshold, and the maximum clique corresponds to an optimum keyword group.

4. The EPG generating method according to claim 3, wherein the step of generating the match score comprises:
    comparing the optimum keyword group with the program description to generate an occurrence frequency of a keyword of the optimum keyword group in the program description by the processor; and
    dividing the occurrence frequency by the keyword count of the optimum keyword group to generate the match score by the processor.

5. The EPG generating method according to claim 4, wherein the step of finding the maximum clique set, comprising:
    constructing a relation matrix of the undirected graph by the processor;
    constructing at least one sub-relation matrix according to the relation matrix, wherein the dimension of the sub-relation matrix is less than or equal to the dimension of the relation matrix by the processor;
    calculating a sum of matrix elements of the sub-relation matrix by the processor;
    determining whether the sum of matrix elements is equal to the square of the dimension of the sub-relation matrix by the processor; and
    setting the sub-relation matrix as the maximum clique when the sum of matrix elements is equal to the square of the dimension of the sub-relation matrix by the processor.

6. The EPG generating method according to claim 2, wherein the maximum clique set comprises a plurality of maximum cliques, the node of each maximum clique must be greater than or equal to a node threshold, and the maximum cliques corresponds to a plurality of optimum keyword groups.

7. The EPG generating method according to claim 6, wherein the step of generating the match score comprises:
    comparing the optimum keyword groups with the program description to generate a plurality of occurrence frequencies of keywords of the optimum keyword group in the program description by the processor;
    dividing the occurrence frequencies by the keyword counts of the optimum keyword groups respectively to generate a plurality of values by the processor; and
    calculating an average value of the values to generate the match score by the processor.

8. The EPG generating method according to claim 7, wherein the step of finding the maximum clique comprises:
    constructing a relation matrix of the undirected graph by the processor;
    constructing at least one sub-relation matrix according to the relation matrix by the processor, wherein the dimension of the sub-relation matrix is less than or equal to the dimension of the relation matrix;
    calculating a sum of matrix elements of the sub-relation matrix by the processor;
    determining whether the sum of matrix elements is equal to the square of the dimension of the sub-relation matrix by the processor; and
    the sub-relation matrix is one of the maximum cliques when the sum of matrix elements is equal the square of the dimension of to the sub-relation matrix.

9. The EPG generating method according to claim 2, wherein, the number of nodes of the node set is equal to the keyword count of the inputting keyword group plus the keyword count of the program name keyword group minus the number of repetitive keywords.

10. The EPG generating method according to claim 2, wherein, the semantic similarity degree corresponding to each edge of the edge set must be greater than or equal to a similarity threshold.

11. An electronic program guide (EPG) generating apparatus electrically coupled to an image display device, comprising:
    a communication device for obtaining the EPG;
    a receiving interface for receiving an inputting keyword group; and
    a processor for retrieving a program name keyword group from the EPG according to the program name corresponding to a program description, wherein the processor constructs a semantic similarity degree matrix according to the inputting keyword group and the program name keyword group, constructs an undirected graph according to the semantic similarity degree matrix, finds a maximum clique set of the undirected graph, generates a match score according to the program description and the maximum clique set, and determines a recommendation sequence of the program name in the EPG according to the match score to transmit the EPG to the image display device and to display the EPG on the image display device.

12. The EPG generating apparatus according to claim 11, wherein the processor constructs a node set according to the inputting keyword group and the program name keyword group, constructs an edge set according to the node set and the semantic similarity degree matrix, and constructs the undirected graph according to the node set and the edge set.

13. The EPG generating apparatus according to claim 12, wherein the maximum clique set comprises a maximum clique whose node must be greater than or equal to a node threshold, and the maximum clique corresponds to an optimum keyword group.

14. The EPG generating apparatus according to claim 13, wherein the processor compares the optimum keyword group with the program description to generate an occurrence frequency of a keyword of the optimum keyword group in the program description, and divides the occurrence frequency by the keyword count of the optimum keyword group to generate the match score.

15. The EPG generating apparatus according to claim 14, wherein the processor constructs a relation matrix of the undirected graph, constructs at least one sub-relation matrix according to the relation matrix whose dimension is less than the dimension of the relation matrix, calculates a sum of matrix elements of the sub-relation matrix, and determines whether the sum of matrix elements is equal to the square of the dimension of the sub-relation matrix, and the sub-relation matrix is the maximum clique when the sum of matrix elements is equal to the square of the dimension of the sub-relation matrix.

16. The EPG generating apparatus according to claim 12, wherein the maximum clique set comprises a plurality of maximum cliques, the node of each maximum clique must be greater than or equal to a node threshold, and the maximum cliques correspond to a plurality of optimum keyword groups respectively.

17. The EPG generating apparatus according to claim 16, wherein the processor compares the optimum keyword groups with the program description to generate some keywords of the optimum keyword group in a plurality of occurrence frequencies of the program description, the processor divides the occurrence frequencies by the keyword counts of the optimum keyword groups respectively to generate a plurality of values, and calculates an average value of the values to generate the match score.

18. The EPG generating apparatus according to claim 17, wherein the processor constructs a relation matrix of the undirected graph, constructs at least one sub-relation matrix according to the relation matrix, the dimension of the sub-relation matrix is less than the dimension of the relation matrix, calculates a sum of matrix elements of the sub-relation matrix, and determines whether the sum of matrix elements is equal the square of the dimension of the sub-relation matrix, and the sub-relation matrix is one of the maximum cliques when the sum of matrix elements is equal to the square of the dimension of the sub-relation matrix.

19. The EPG generating apparatus according to claim 12, wherein, the number of nodes of the node set is equal to the keyword count of the inputting keyword group plus the keyword count of the program name keyword group minus the number of repetitive keywords.

20. The EPG generating apparatus according to claim 12, wherein, the semantic similarity degree corresponding to each edge of the edge set must be greater than or equal to a similarity threshold.

\* \* \* \* \*